United States Patent [19]
Cook, Jr. et al.

[11] 3,878,072
[45] Apr. 15, 1975

[54] ELECTROLYTIC METHOD FOR THE MANUFACTURE OF CHLORATES

[75] Inventors: Edward H. Cook, Jr., Lewiston; Alvin T. Emery, Youngstown, both of N.Y.

[73] Assignee: Hooker Chemicals & Plastics Corporation, Niagara Falls, N.Y.

[22] Filed: Nov. 1, 1973

[21] Appl. No.: 411,612

[52] U.S. Cl. .................. 204/95; 204/98; 204/128; 204/263; 204/296
[51] Int. Cl. ...... C01b 11/26; C01d 1/06; B01k 3/12
[58] Field of Search ................................ 204/95, 98

[56] References Cited
UNITED STATES PATENTS

| | | | |
|---|---|---|---|
| 665,426 | 1/1901 | Gibbs | 204/95 |
| 2,584,824 | 2/1952 | Vanhaven et al. | 204/95 |
| 3,234,110 | 2/1966 | Beer | 204/290 F |
| 3,438,879 | 4/1969 | Kivcher et al. | 204/95 |
| 3,535,215 | 10/1970 | Grathero | 204/95 |
| 3,657,102 | 4/1972 | Keith et al. | 204/290 F |
| 3,784,399 | 1/1974 | Grot | 260/79.3 MU |

FOREIGN PATENTS OR APPLICATIONS

| | | | |
|---|---|---|---|
| 1,045,675 | 10/1966 | United Kingdom | 204/92 |

Primary Examiner—F. C. Edmundson
Attorney, Agent, or Firm—Peter F. Casella; Donald C. Studley

[57] ABSTRACT

Chlorates, such as alkali metal chlorates, are made by electrolyzing brine in a cell having a plurality of compartments or zones therein preferably three, wherein anode and cathode compartments are separated by a buffer compartment formed by permselective membranes of a hydrolyzed copolymer of tetrafluoroethylene and a fluorosulfonated perfluorovinyl ether, or a sulfostyrenated perfluorinated ethylene propylene polymer, or by such a permselective membrane on the cathode side plus a porous diaphragm on the anode side, while reacting chlorine gas with the buffer zone contents in the zone or removed from it, while being under such conditions as to produce hypochlorite and/or chlorate and chloride therein, converting any hypochlorite to chlorate and chloride, and passing a solution of such chlorate and chloride in a liquid medium into the anode compartment and electrolyzing the chloride thereof. By such a process, with continued recirculation of the product solution until the chlorate content is sufficiently high, a relatively concentrated chlorate solution can be produced containing proportionally less chloride, due to its conversion to chlorate, and obviating the need for additional processing to remove chloride before chlorate could be obtained low in chloride and at an acceptable concentration.

9 Claims, 1 Drawing Figure

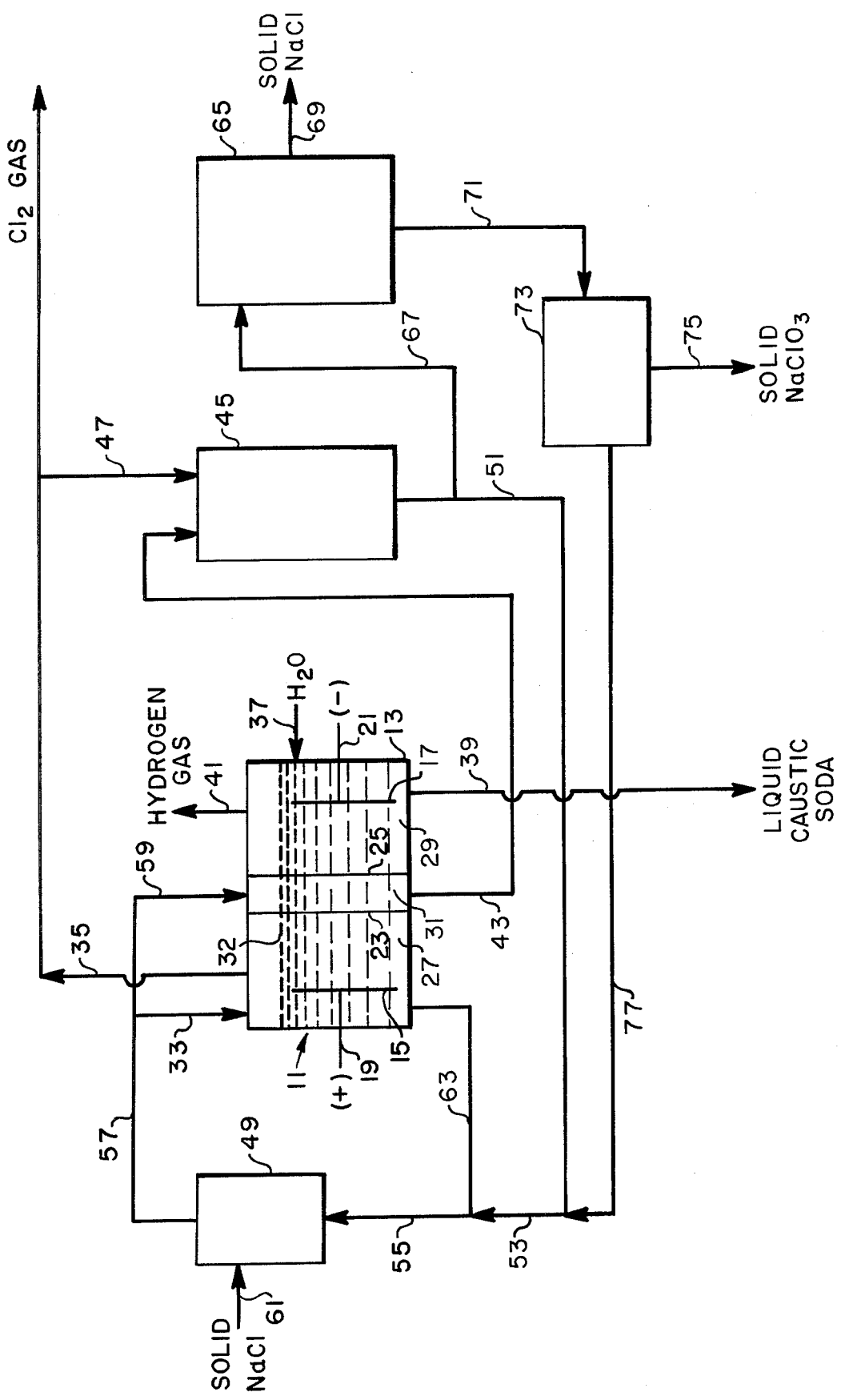

ELECTROLYTIC METHOD FOR THE MANUFACTURE OF CHLORATES

This invention relates to the manufacture of chlorates. More specifically, it is of a process for making alkali metal chlorate from chlorine and aqueous alkali metal hydroxide solution, both of which reactants are produced in an electrolytic cell comprising anode, cathode and one or more buffer compartments, with the means provided for separating the cathode compartment and an adjoining buffer compartment being a permselective membrane which is of a hydrolyzed copolymer of a perfluorinated hydrocarbon and a sulfonated perfluorovinyl ether. Modified forms of the copolymer are also useful as membranes, as are sulfostyrenated perfluorinated ethylene propylene polymers. The chlorate is readily separable from chloride produced with it in the chloration reaction, at a reasonably high concentration because the content of chloride accompanying the chlorate is diminished by electrolysis thereof.

The described cation-permeable membrane permits flow of hydroxyl ion from the catholyte to the buffer zone but does not allow chloride ion to pass through it to mix with the hydroxyl in the cathode compartment. Thus, hydroxide (or its products of the invention, hypochlorite or chlorate) is transported to the buffer compartment but chloride from the buffer compartment does not contaminate the hydroxide manufactured in the cathode compartment. Excess hydroxy ion in the buffer compartment is physically or chemically removed therefrom before it can migrate to the anode compartment, which migration could cause a diminution of current efficiency by conversion to oxygen. In the embodiments of the invention wherein hypochlorite or chlorate is manufactured in the buffer compartment a lower rate of circulation is maintainable in that compartment without having current efficiency drop significantly. This is so because hydroxyl has been removed by formation of hypochlorite or chlorate and these do not penetrate the copolymer membrane. In such cases where an ordinary diaphragm is used as a boundary between the anode and buffer compartments, even if some chlorate or hypochlorite does pass to the anode compartment, no harm is done because its presence does not interfere with current efficiency.

Chlorine and caustic are normally commercially produced by the electrolysis of an aqueous salt solution, either in diaphragm or mercury cells. Improved diaphragm cells utilize dimensionally stable anode, which include noble metals, alloys or oxides or mixtures thereof on valve metals on conductors or fastened to them. The concept of employing permselective diaphragms to separate anolyte from catholyte during electrolysis is not a new one and plural compartment electrolytic cells have been suggested in which one or more of such membranes may be employed. Recently, improved membranes which are of a hydrolyzed copolymer of a perfluorinated hydrocarbon and a fluorosulfonated perfluorovinyl ether have been described and in some experiments these have been used as the membranes between the catholyte and buffer zones of chlorine-caustic cells. In recent work by other employees of the assignee of the present application the importance of the use of the present membranes between buffer zones and the cathode (and anode) compartment(s) during the electrolysis of alkali metal chloride solutions was established and a patent application entitled *Electrolytic Method for the Manufacture of Hypochlorites*, describing methods for making hypochlorites and chlorates is being filed by them simultaneously with the present application. The inventors therein are Eng and Harke and the application is Case 3199. That application is hereby incorporated herein by reference.

Although the simultaneously filed application for *Electrolytic Method for the Manufacture of Hypochlorites* describes the manufacture of chlorate internally and externally of the cell, unlike the present process the processes described therein require chlorine to be added to the buffer zone to react therein to make hypochlorite and/or chlorate. Furthermore, the instant invention represents a distinct improvement over the method of the other application because at least some of the chloride produced by the reaction by which chlorate is manufactured is electrolyzed in the present process to diminish the chloride content of the chlorate solution, making higher chlorate concentrations possible and making the chlorate more readily separable as a solid from aqueous solutions thereof containing chloride. In other words, the normal chloride content of such solution could interfere with crystallization of the chlorate and such interferences are prevented by electrolyzing the chlorate-chloride mixture to diminish the chloride content thereof. The chlorine produced is employed to manufacture chlorate from hydroxide simultaneously made in the electrolysis. In following the method of the present invention the chlorate may be made in the buffer compartment or may be produced outside the cell. The latter method is now preferred. In either case solutions containing mixtures of chlorate and chloride made from the hydroxide of the buffer compartment or produced in that compartment are sent to the anode compartment where chloride is removed from them, without affecting the chlorate content.

In accordance with the present invention a method for electrolytically manufacturing chlorate comprises electrolyzing an aqueous solution containing chloride and chlorate ions in an electrolytic cell having at least three compartments therein, an anode a cathode, at least one permselective membrane of a hydrolyzed copolymer of a perfluorinated hydrocarbon and a fluorosulfonated perfluorovinyl ether, or a sulfostyrenated perfluorinated ethylene propylene polymer, defining a cathode-side wall of a buffer compartment between the anode and cathode, an anodeside wall of said buffer compartment being defined by such a permselective membrane or a porous diaphragm, and such walls, with walls thereabout, defining anode and cathode compartments, reacting gaseous chlorine with the contents of the buffer compartment and/or solution removed from it and regulating the rate of feed thereof and reaction conditions to produce hypochlorite or chlorate and chloride from hydroxide therein, and converting the hypochlorite, when produced, to chlorate and chloride, and feeding at least a portion of the chlorate and chloride produced thereby to the anode compartment for electrolysis of chloride therein to chlorine, with a resulting increase in the proportion of chlorate to chloride in the anolyte therein.

The invention will be readily understood by reference to the descriptions of embodiments thereof, taken in conjunction with the drawing of means of carrying out a preferred embodiment of the process.

In the drawing:

The FIGURE represents schemtically the arrangement of equipment for producing hydroxide electrolytically, converting it to chlorate and chloride, electrolyzing the chloride to increase the proportion of chlorate therein and removing the chlorate as a solid.

In the FIGURE, to facilitate understanding of the process the flows of typical and preferred reactants and products are illustrated. However, in addition to sodium, other alkali metal and halide-forming cations may also be employed and in some embodiments of the invention bromine may be at least partially substituted for chlorine.

In the FIG. electrolytic cell 11 includes outer wall 13, anode 15, cathode 17 and conductive means 19 and 21 for connecting the anode and the cathode to sources of positive and negative electric potential, respectively. Inside the walled cell cation-permselective membranes 23 and 25 divide the volume into anode or anolyte compartment 27, cathode or catholyte compartment 29 and buffer compartment 31. An aqueous solution 32 of alkali metal halide and corresponding halate, preferably sodium chloride and sodium chlorate, is fed to the anolyte compartment through line 33 and the chloride content thereof is electrolyzed to chlorine, without the chlorate being affected. The chlorine exits through line 35 and the flow is divided, with part being subsequently reacted with hydroxide to form chlorate and the remainder being removed for sale or other use. In catholyte compartment 29, to which water is admitted through line 37, hydroxide and hydrogen are produced, the former being taken off through line 39 and the latter being removed through line 41. Some of the hydroxide passes through membrane 25 into buffer zone 31 and it is this hydroxide that is subseqently reacted with chlorine to produce chlorate. Liquor from buffer compartment 31 is removed from it through line 43 and is conveyed to a reactor-retention vessel 45 where it is reacted with chlorine delivered to such reactor through line 47. The result of the reaction, an aqueous solution of chloride and chlorate, is delivered to a resaturator 49 via lines 51, 53, 55. There, together with other circulating liquors with which it is blended and which will be referred to later, the mixture is increased in salt concentration and subsequently is delivered to the anolyte compartment through lines 57 and 33, for conversion of the chloride to chlorine. A proportion of the liquid from the resaturator is delivered to the buffer compartment through line 59. It is highly preferred to employ solid sodium chloride, added in the salt saturator, as at 61. However, in some instances at least a proportion of the sodium chloride added can be as a concentrated brine, providing that a concentrated brine is thereby obtainable.

As previously described, the process may be utilized to increase, actually and proportionally, the chlorate content of the circulating liquor. However, with more chloride being produced in the reactor than chlorate, problems in crystallization out of chloride are confronted as the chlorate and chloride contents are increased. Accordingly, depleted anolyte, capable of diluting the chlorate solution, is recirculated to the salt saturator through 63. Also, after buildup of the chlorate content to a sufficient level to allow for removal of the chlorate and chloride from the solution in the crystallizer, these are crystallized out. A proportion of the product from the reactor and retention vessel 45 is delivered to crystallizer 65 through line 67 and solid sodium chloride crystals are removed at 69. Then, the sodium chlorate is crystallized out and solution containing such crystals is delivered via line 71 to separator 73, from which solid sodium chlorate crystals are taken off at 75. Mother liquor remaining is delivered through line 77, 53 and 55 to the salt resaturator 49, having been admixed with circulating anolyte and reactor vessel product en route. Of course, the solid sodium chloride obtained at 69 may be returned to the system by addition to resaturator 49 and 61.

From the described process it will be evident that the ratios of the recirculated anolyte, reaction vessel liquid product and mother liquor remaining after removal of chlorate and chloride from the reactor vessel liquid may be blended in desired proportions so as to produce a most preferred ratio of chlorate and chloride in the crystallizer and in the anolyte and buffer compartments of electrolytic cell 11. Because of the circulation of the mixed chlorate and chloride solution through the anode compartment the chloride content is electrolytically reduced and problems of premature crystallization out of chloride are avoided. Also, the need for additional equipment to first remove chloride before delivery of the solution to a chlorate crystallizer is obviated. During the process the rate of circulation of the electrolyte through the buffer compartment is controllable so as to maintain the hydroxide concentration therein at a desired level, thereby preventing transmission of any hydroxide or at least, of an objectionable proportion thereof, through membrane 23 to the anolyte, where it could interfere with the anode compartment current efficiency. Also, the presence in the buffer compartment 31 of chlorate and chloride ions helps to limit passage of hydroxyl ions through membrane 23.

From the above description it is apparent that with the addition of only chloride and water to the system, plus electrical, thermal, mechanical and chemical energy, there is produced chlorine, liquid hydroxide, solid chlorate and hydrogen. Of course, in preferred embodiments of the invention sodium chloride and water are charged and chlorine, high strength aqueous caustic soda solution, solid sodium chlorate and hydrogen are produced.

In a variation of the described processes the reactor vessel may be omitted or its function may be supplemented by producing chlorate in the buffer compartment. This is effected by addition of chlorine to such compartment under chlorate-forming conditions. A low pH, e.g., 6 to 7.5, preferably 6 to 7, is employed. In such an embodiment of the invention the effluent from the buffer compartment may be directed immediately to the chlorate crystallizer. Alternatively, the hypochlorite reaction or a proportion of the chlorate reaction may occur in the cell and further chloration may be effected in an external reactor. When chloration is carried out in the buffer compartment the migration of hydroxyl ion through the membrane to the anolyte is prevented (it reacts with the chlorine to form hypochlorite or chlorate and chloride and hence is not available for transmission to the anode compartment) and liquid circulation rates may be diminished, accordingly. Because the modified process is so much like that of the FIGURE, only differing in the addition of chlorine and, when hypochlorite is produced, regulation of buffer solution pH to 8 to 11, no individual illustration thereof is given herein.

In the drawing and in the above description a pair of the described membranes is employed to form the three compartments of the present cells but it will be evident that a greater number of compartments, e.g., 4 to 6, including plural buffer zones may be utilized. Similarly, although the compartments will usually be separated by flat membranes and will normally be of substantially rectilinear or parallelepipedal construction, other shapes, including curves, e.g., ellipsoids, irregular surfaces, e.g., sawtoothed or plurally pointed walls, may also be utilized. In other variations of the invention, the buffer zone or zones may be between bipolar electrodes. Because those of skill in the art will known which variations of structure should be made to accommodate such electrodes these will not be described in detail. Also, as is known in the art, a plurality of individual cells may be employed in multicell units, which may often have common feed and product manifolds and which are preferably housed in unitary structures. Such constructions are known and will not be discussed further herein.

For satisfactory and efficient operations the volume of the buffer compartment or compartments will normally be from 1 to 100% that of the sum of the volumes of the anode and cathode compartments, preferably from 5 to 70%, and the anode and cathode compartment volumes will be approximately the same.

Although the utilization of the present cationic or cation-active membranes to define the buffer compartment(s) and separate it/them from the anolyte and catholyte sections is highly preferred it is possible to operate with a conventional diaphragm separating the anode compartment from the buffer compartment. However, the membrane will be employed to separate the catholyte from the buffer zones in order to produce the highly desirable salt-free caustic. Otherwise, even if such a membrane was employed to separate the anolyte from the buffer zone, halide present in the buffer section due to addition of brine or production by the reaction of chlorine with the caustic to form hypochlorite, could pass through the diaphragm to contaminate the caustic. In many applications salt-free caustic is highly desirable and therefore, structures such as that illustrated in the U.S. Environmental Protection Agency publication entitled *Hypochlorite Generator for Treatment of Combined Sewer Overflows* (Water Pollution Control Research Series 11023 DAA 03/72) are unsatisfactory. Additionally, the conventional diaphragms, which are usually of deposited asbestos fibers, tend to become blocked with insoluble impurities from the brine and have to be cleaned periodically, usually necessitating shutdown of the cell and often, replacement of the diaphragm.

The aqueous solution containing chloride ions is normally a water solution of sodium chloride, although potassium or other soluble chlorides, e.g., magnesium chloride and other such salts, may be utilized, at least in part. However, it is highly preferable to employ the alkali metal chlorides and of these, sodium chloride is the best. Sodium and potassium chlorides include cations which do not form insoluble salts or precipitates and which produce stable hydroxides and comparatively stable chlorates. The concentration of alkali metal chloride in the feed charged to the anolyte and buffer compartments will usually be as high as feasible within the solubility limits imposed by the presence of chlorate, too, normally being from 200 to 320, preferably 240 to 300 for sodium chloride and from 200 to 360 g./l. for potassium chloride, with intermediate figures for mixtures of sodium and potassium chlorides. The anolyte withdrawn will have a sodium chloride content of about 150 to 250 g./l. and the chlorate content charged to the anolyte will normally be in the range of 150 to 450 g./l. Of course, concentrations of chlorate will be approximately the same in the effluent from the anode compartment. The buffer zone solution composition will be essentially the same as that charged to the anode compartment except for the addition of hydroxide transmitted to the buffer compartment from the catholyte. Such hydroxide concentration will generally be in the range of from 10 to 50 g./l. whereas in the catholyte compartment it will be from 200 to 350 g./l. The low caustic concentration in the buffer solution prevents salting out of the chlorate and, because the buffer zone also includes the chloride and chlorate concentrations of the anolyte, the low caustic proportion therein actually improves conductivity. Water may be charged to the buffer compartment, as well as to the catholyte and sometimes the anolyte, or brine, too. Dilute caustic, if available without chloride contamination, may be charged to the catholyte. The various charges may be added as part of a continuous, batch or once-through process. During operation of the cell, chlorine gas efficiencies range from 95 to 99% and sodium ion efficiencies are from 85 to 99%. The efficiencies described are obtainable only with the present three compartment (or more) cells. When the preferred membrane materials are employed but only a two compartment cell is utilized chlorine gas efficiency decreases to as low as 50%. The efficiencies recited are based on percentages of chlorine gas and caustic or sodium ion actually produced or recovered in a useful material manufactured, compared to 100% for that theoretically obtainable from the quantity of electric charges transferred.

In a typical cell of the above described type, for one ton of chlorine produced in the cell there are produced about 0.67 ton of strong caustic solution, 0.6 ton of chlorine (for sale) and 0.18 ton of sodium chlorate, all figures being ±10%.

In modifications of the described process additional chlorate may be produced by reacting additional chlorine with some of the strong caustic solution made. The caustic solution may be admixed with the buffer compartment material in the reactor-retainer or before addition to such vessel. Then, a proportion of the product solution may be fed back to the resaturator, with the other circulating streams. Alternatively, the chlorate may be made by separate reaction of the strong sodium hydroxide solution and chlorine gas and the chloride may be removed from it by electrolysis in a separate cell or by other suitable means. Also, instead of preparing solid chlorate, the mixture of chlorate and chloride obtained from the reactor, in solution, may be utilized, or that removed from the anode compartment, depleted in chloride, may be employed in bleaching applications, for the production of chlorine dioxide or in other uses of chlorate where the solution form and the presence of chloride are unobjectionable.

The presently preferred cation permselective membrane is of a hydrolyzed copolymer of perfluorinated hydrocarbon and a fluorosulfonated perfluorovinyl ether. The perfluorinated hydrocarbon is preferably tetrafluoroethylene, although other perfluorinated and saturated and unsaturated hydrocarbons of 2 to 5 carbon atoms may also be utilized, of which the monoolefinic hydrocarbons are preferred, especially those of 2 to 4 carbon atoms and most especially those of 2 to 3 carbon atoms, e.g., tetrafluoroethylene, hexafluoropropylene. The sulfonated perfluorovinyl ether which is most useful is that of the formula $FSO_2CF_2CF_2OCF(CF_3)CF_2OCF=CF_2$. Such a material, named as perfluoro[2-(2-fluorosulfonylethoxy)-propyl vinyl ether], referred to henceforth as PSEPVE, may be modified to equivalent monomers, as by modifying the internal perfluorosulfonylethoxy component to the corresponding propoxy component and by altering the propyl to ethyl or butyl, plus rearranging positions of substitution of the sulfonyl thereon and utilizing isomers of the perfluorolower alkyl groups, respectively. However, it is most preferred to employ PSEPVE.

The method of manufacture of the hydrolyzed copolymer is described in Example XVII of U.S. Pat. No. 3,282,875 and an alternative method is mentioned in Canadian Pat. No. 849,670, which also discloses the use of the finished membrane in fuel cells, characterized therein as electrochemical cells. The disclosures of such patents are hereby incorporated herein by reference. In short, the copolymer may be made by reacting PSEPVE or equivalent with tetrafluoroethylene or equivalent in desired proportions in water at elevated temperature and pressure for over an hour, after which time the mix is cooled. It separates into a lower perfluoroether layer and an upper layer of aqueous medium with dispersed desired polymer. The molecular weight is indeterminate but the equivalent weight is about 900 to 1,600 preferably 1,100 to 1,400 and the percentage of PSEPVE or corresponding compound is about 10 to 30%, preferably 15 to 20% and most preferably about 17%. The unhydrolyzed copolymer may be compression molded at high temperature and pressure to produce sheets or membranes, which may vary in thickness from 0.02 to 0.5 mm. These are then further treated to hydrolyze pendant —$SO_2F$ groups to —$SO_3H$ groups, as by treating with 10% sulfuric acid or by the methods of the patents previously mentioned. The presence of the —$SO_3H$ groups may be verified by titration, as described in the Canadian patent. Additional details of various processing steps are described in Canadian Pat. No. 752,427 and U.S. Pat. No. 3,041,317, also hereby incorporated by reference.

Because it has been found that some expansion accompanies hydrolysis of the copolymer it is preferred to position the copolymer membrane after hydrolysis onto a frame or other support which will hold it in place in the electrolytic cell. Then it may be clamped or cemented in place and will be true, without sags. The membrane is preferably joined to the backing tetrafluoroethylene or other suitable filaments prior to hydrolysis, when it is still thermoplastic, and the film of copolymer covers each filament, penetrating into the spaces between them and even around behind them, thinning the films slightly in the process, where they cover the filaments.

The membrane described is far superior in the present processes to all other previously suggested membrane materials. It is more stable at elevated temperatures, e.g., above 75°C. It lasts for much longer time periods in the medium of the electrolyte and the caustic product and does not become brittle when subjected to chlorine at high cell temperatures. Considering the savings in time and fabrication costs, the present membranes are more economical. The voltage drop through the membranes is acceptable and does not become inordinately high, as it does with many other membrane materials, when the caustic concentration in the cathode compartment increases to above about 200 g./l. of caustic. The selectivity of the membrane and its compatibility with the electrolyte does not decrease detrimentally as the hydroxyl concentration in the catholyte liquor increases, as has been noted with other membrane materials. Furthermore, the caustic efficiency of the electrolysis does not diminish as significantly as it does with other membranes when the hydroxyl ion concentration in the catholyte increases. Thus, these differences in the present process make it practicable, whereas previously described processes have not attained commercial acceptance. While the more preferred copolymers are those having equivalent weights of 900 to 1,600, with 1,100 to 1,400 being most preferred, some useful resinous membranes produced by the present method may be of equivalent weights from 500 to 4,000. The medium equivalent weight polymers are preferred because they are of satisfactory strength and stability, enable better selective ion exchange to take place and are of lower internal resistances, all of which are important to the present electro-chemical cell.

Improved versions of the above-described copolymers may be made by chemical treatment of surfaces thereof, as by treatments to modify the —$SO_3H$ group thereon. For example, the sulfonic group may be altered or may be replaced in part with other moieties. Such changes may be made in the manufacturing process or after production of the membrane. When effected as a subsequent surface treatment of a membrane the depth of treatment will usually be from 0.001 to 0.01 mm. Caustic efficiencies of the invented processes, using such modified versions of the present improved membranes, can increase about 3 to 20%, often about 5 to 15%. Exemplary of such treatments is that described in French Pat. No. 2,152,194 of Mar. 26, 1973 in which one side of the membrane is treated with $NH_3$ to form $SO_2NH_2$ groups.

In addition to the copolymers previously discussed, including modifications thereof, it has been found that another type of membrane material is also superior to prior art films for applications in the present processes. Although it appears that tetrafluoroethylene (TFE) polymers which are sequentially styrenated and sulfonated are not useful for making satisfactory cation-active permselective membranes for use in the present electrolytic processes it has been established that perfluorinated ethylene propylene polymer (FEP) which is styrenated and sulfonated makes a useful membrane. Whereas useful lives of as much as three years or more (that of the preferred copolymers) may not be obtained the sulfostyrenated FEP's are surprisingly resistant to hardening and otherwise failing in use under the present process conditions.

To manufacture the sulfostyrenated FEP membranes a standard FEP, such as manufactured by E. I. DuPont de Nemours and Co. In., is styrenated and the styrenated polymer is then sulfonated. A solution of styrene in methylene chloride or benzene at a suitable concentration in the range of about 10 to 20% is prepared and a sheet of FEP polymer having a thickness of about 0.02 to 0.5 mm., preferably 0.05 to 0.15 mm., is dipped into the solution. After removal it is subjected to radiation treatment, using a cobalt[60] radiation source. The rate of application may be in the range of about 8,000 rads/hr. and a total radiation application is about 0.9 megarad. After rinsing with water the phenyl rings of the styrene portion of the polymer are monosulfonated, preferably in the para position, by treatment with chlorosulfonic acid, fuming sulfuric acid or $SO_3$. Preferably, chlorosulfonic acid in chloroform is utilized and the sulfonation is completed in about ½ hour.

Examples of useful membranes made by the described process are products of RAI Research Corporation, Hauppauge, New York, identified as 18ST12S and 16ST13S, the former being 18% styrenated and having ⅔ of the phenyl groups monosulfonated and the latter being 16% styrenated and having 13/16 of the phenyl groups monosulfonated. To obtain 18% styrenation a solution of 17-½% of styrene in methylene chloride is utilized and to obtain the 16% styrenation a solution of 16% of styrene in methylene chloride is employed.

The products resulting compare favorably with the preferred copolymers previously described, giving voltage drops of about 0.2 volt each in the present cells at a current density of 2 amperes/sq. in., the same as is obtained from the copolymer.

The membrane walls will normally be from 0.02 to 0.5 mm. thick, preferably from 0.1 to 0.5 mm. and most preferably 0.1 to 0.3 mm. When mounted on a polytetrafluoroethylene, asbestos, titanium or other suitable network, for support, the network filaments or fibers will usually have a thickness of 0.01 to 0.5 mm., preferably 0.05 to 0.15 mm., corresponding to up to the thickness of the membrane. Often it will be preferable for the fibers to be less than half the film thickness but filament thicknesses greater than that of the film may also be successfully employed, e.g., 1.1 to 5 times the film thickness. The networks, screens or cloths have an area percentage of openings therein from about 8 to 80%, preferably 10 to 70% and most preferably 30 to 70%. Generally the cross sections of the filaments will be circular but other shapes, such as ellipses, squares and rectangles, are also useful. The supporting network is preferably a screen or cloth and although it may be cemented to the membrane it is preferred that it be fused to it by high temperature, high pressure compression before hydrolysis of the copolymer. Then, the membrane-network composite can be clamped or otherwise fastened in place in a holder or support. It is preferred to employ the described backed membranes as walls of the cell between the anolyte and catholyte compartments and the buffer compartment(s) but if desired, that separating the anolyte and buffer compartments may be of conventional diaphragm material, e.g., deposited asbestos fibers or synthetic polymeric fibrous material (polytetrafluoroethylene, polypropylene). Also, treated asbestos fibers may be utilized and such fibers mixed with synthetic organic polymeric fibers may be employed. However, when such diaphragms are used efforts should be made to remove hardness ions and other impurities from the feed to the cell so as to prevent these from prematurely depositing on and blocking the diaphragms.

The material of construction of the cell body may be conventional, including concrete or stressed concrete lined with mastics, rubbers, e.g., neoprene, polyvinylidene chloride, FEP, chlorendic acid based polyester, polypropylene, polyvinyl chloride, TFE or other suitable plastic or may be similarly lined boxes of other structural materials. Substantially self-supporting structures, such as rigid polyvinyl chloride, polyvinylidene chloride, polypropylene or phenol formaldehyde resins may be employed, preferably reinforced with molded-in fibers, cloths or webs.

The electrodes of the cell can be made of any electrically conductive material which will resist the attack of the various cell contents. In general, the cathodes are made of graphite, iron, lead dioxide on graphite or titanium, steel or noble metal, such as platinum, iridium, ruthenium or rhodium. Of course, when using the noble metals, they may be deposited as surfaces on conductive substrates, e.g., copper, silver, aluminum, steel, iron. The anodes are also of materials or have surfaces of materials such as noble metals, noble metal alloys, noble metal oxides, noble metal oxides mixed with valve metal oxides, e.g., ruthenium oxide plus titanium dioxide, or mixtures thereof, on a substrate which is conductive. Preferably, such surfaces are on or with a valve metal and connect to a conductive metal, such as those previously described. Especially useful are platinum, platinum on titanium, platinum oxide on titanium, mixtures of ruthenium and platinum and their oxides on titanium and similar surfaces on other valve metals, e.g., tantalum. The conductors for such materials may be aluminum, copper, silver, steel or iron, with copper being much preferred. A preferable dimensionally stable anode is ruthenium oxide-titanium dioxide mixture on a titanium substrate, connected to a copper conductor.

The voltage drop from anode to cathode is usually in the range of about 2.3 to 5 volts, although sometimes it is slightly more than 5 volts, e.g., up to 6 volts. Preferably, it is in the range of 3.5 to 4.5 volts. The current density, while it may be from 0.5 to 4 amperes per square inch of electrode surface, is preferably from 1 to 3 amperes/sq. in. and ideally about 2 amperes/sq. in. The voltage ranges given are for perfectly aligned electrodes and it is understood that where such alignment is not exact, as in laboratory units, the voltages can be up to about 0.5 volt higher. At the current densities about 30 to 50% of the current is utilized in making buffer compartment caustic (it is made in the cathode compartment but migrates to the buffer solution) and the balance of 50 to 70% of the current is applied to making the strong caustic solution in the cathode compartment. Preferably, the ratio of caustic amounts produced in these compartments is about 2:3 for buffer:cathode compartments. The feeding of gaseous chlorine from the main chlorine stream to enable it to react with sodium hydroxide entering the reactor-retention vessel from the buffer compartment and to convert substantially all of that to chlorate is regulated in response to any variations in caustic additions to the reactor. Thus, it will normally be such as to control the pH in the range of 6 to 7.5, preferably 6 to 7. An excess of chlorine, often from 5 to 20%, may be used to adjust the pH to the desired range. Alternatively, other acidifying agents may be employed to control the pH and different means, e.g., mechanical flow controlling devices, may be utilized to regulate flows of reactants to assure that the best production of chlorate results. Since about 40% of the sodium hydroxide is "produced" in the buffer compartment it takes about 40% of the chlorine produced to react with it to make sodium chlorate. Thus, about 40% of the sodium chloride would be consumed in manufacturing the chlorate and about 60% would be employed in making sodium hydroxide and chlorine. Flow rates of the various streams are adjustable accordingly, ±10%. Approximately the same proportion of sodium hydroxide is employed to make chlorate when in-cell manufacture thereof is practiced.

Operating temperatures in the various cells and reaction vessels are also regulated, generally being held below 105°C. and preferably being in the range of 20° to 95°C. A more preferable range is of 50 to 95°C. and most preferably a temperature of 65° to 95°C. is maintained, especially for in-cell chloration reactions. Such temperatures apply to the electrolyte in the anolyte and the catholyte compartments, as well as to the buffer compartment. However, pH's in such compartments may be different from that of the buffer zone solution, usually being from 1 to 5, preferably from 2 to 4 in the anolyte and about 14 in the catholyte, while the buffer zone pH will normally be intermediate, e.g., 8 to 11 when hypochlorite is made in the buffer compartment, and 6 to 7.5 when chlorate is made there, but can be 14 when any caustic is in the effluent. When neither hypochlorite nor chlorate is made in the buffer zone there is no need to circulate anolyte or feed solution to the buffer compartment (it would only make chloride chemically).

The temperature of the electrolyte may be controlled by recirculations of various portions thereof and by feed rates. Clearly, it is affected by proportions of feeds employed and the temperatures thereof. Feed quantities and temperatures can be regulated to obtain the desired cell and reactor temperatures. Also, when the temperature is not lowered sufficiently by recirculation or adjustment of the feed rates, refrigeration, especially of recirculating liquid, may also be utilized. For example, recirculating anolyte may be cooled to about 5° to 20°C., preferably about 10°C., before being returned to its compartment.

Although the proportions of flows to the various parts of the system will vary, depending on desired products, reaction temperatures and pH adjustments, usually it may be said that the ratios of mother liquor to reactor liquor to recirculated anolyte will be in the range of 1.0:0.2–5:0.5–10 and preferably the weight and volume ratios will be about 1:1:1. In a modification of the process, instead of the resaturated feed to the buffer compartment, a similar volume of depleted anolyte may be delivered to the buffer zone directly from the anode compartment or mixtures of feeds from the resaturator and the anode compartment may be admixed with the buffer solution. Essentially the same operation results despite the change.

Advantages of the present invention may be summarized as high current efficiency, long life of cell membranes, production of caustic solution in concentrated form, production of chlorate in desirable liquid composition or as a solid, flexibility of operation, economy, production of chloride-free caustic and saving of a chloride removal step before chlorate crystallization. The caustic made is free of chloride, normally containing as little as 0.1 to 10 g./1. thereof, with chlorate concentrations (if aqueous solutions are desired) up to 450 g./1. resulting. The sodium hydroxide concentration can be increased in the aqueous solution from the cathode compartment by feeding dilute sodium hydroxide or by recirculating sodium hydroxide solution previously removed, increasing the electrolysis time or diminishing the rate of caustic takeoff. Alternatively, such more concentrated caustic solutions may be made by evaporation of comparatively dilute solutions which may be produced. Because such solutions are more concentrated than are usually obtained from membrane cells the evaporation procedure is more economical.

The present cells may be incorporated in large and small plants, ranging from those with a capacity of 20 to 1,000 tons per day of chlorine or equivalent produced and in all cases efficiencies obtainable are such as to make the process economically desirable. It is highly preferred however, that the installations should be located near to and be used in conjunction with a pulp bleaching plant or other facilities so that the chlorate made (if in liquid form) can be employed directly in the production of bleaching agent, e.g., chlorine dioxide, without the need for evaporation or crystallization procedures.

The following examples illustrate but do not limit the invention. Unless otherwise indicated, all parts are by weight and all temperatures are in °C.

EXAMPLE 1

Sodium hypochlorite is produced in the three-compartment electrolytic cell and accompanying apparatus illustrated in the figure. The electrolytic cell has polyester walls in its anolyte compartment, steel walls in its catholyte compartment and polypropylene walls for its buffer compartment but concrete walls lined with polyvinyl chloride (plasticizer-free) may be substituted. The anode employed is of titanium mesh, one millimeter in diameter and having about 50% open area, coated with a mixture of ruthenium oxide and titanium oxide 1 mm. thick, the ratio of ruthenium oxide to titanium oxide being about 1:3. The titanium mesh is communicated with a positive direct current electrical source through a titanium-clad copper conductor rod. The cathode is of mild steel wire mesh, essentially 1 mm. in equivalent diameter, having about 35% open area and is communicated with a negative electrical source or sink by a copper conductor. A single anode and a single cathode are used in the experimental apparatus, each being 2 inches wide and 30 inches long. The walls separating the anode and cathode compartments and defining the buffer compartment are of a cation-active permselective membrane manufactured by E. I. DuPont de Nemours and Company, Inc., and sold as XR-type membrane. Such membrane is 7 mils thick (about 0.2 mm.) and is joined to a backing or supporting network of polytetrafluoroethylene (Teflon) filaments of a diameter of about 0.1 mm., woven into a cloth which has an area percentage of openings therein of about 22%. The cross-sectional shape of the filaments is substantially circular and the membranes mounted on them are essentially flat. They were initially flat and were fused onto the screen or cloth of Teflon by high temperature, high compression pressing, with some of the membrane portions actually flowing around the filaments during a fusion process to lock onto the cloth, without thickening the membrane between the cloth filaments.

The material of the XR-type permselective membrane is a hydrolyzed copolymer of a perfluorinated hydrocarbon and a fluorosulfonated perfluorovinyl ether.

The copolymer is of tetrafluoroethylene and $FSO_2CF_2CF_2OCF(CF_3)CF_2OCF=CF_2$ and has an equivalent weight in the 900 to 1,600 range, about 1,250.

In the electrolytic cell illustrated in the figure, for clarity of presentation and in accord with conventional cell illustration, spaces are shown between the buffer compartment membranes and the electrodes but for the practice of this experiment the electrodes are in contact with the buffer membranes, with the "flatter" sides of the membranes facing the contacting electrodes. If desired, spacings of 0.01 to 5 mm. may be utilized, but the present arrangement and absence of spacing is preferred. The buffer compartment between is ⅜ inch wide (9 mm.) and the interelectrode distance is essentially the same. With excellent alignments of the electrodes and using tight membranes the interelectrode or intermembrane distances may be reduced to ¼ inch (6 mm.), at which the average voltages are reduced by 10 to 20%, usually about 15%, when operating at a temperature in the 85–100°C. range, preferably being about 95°C. Total cell volume is approximately 8.4 liters, of which the anode compartment, buffer compartment and cathode compartment contain about 47%, and 6% and 47%, respectively.

The anode compartment is filled with a saturated salt solution or brine and the cathode and buffer compartments are filled with water, initially containing a small quantity of salt or brine to improve conductivity. The current is turned on and chlorine produced is fed to the buffer compartment to convert the sodium hydroxide transmitted thereto to sodium hypochlorite and sodium chloride, with the pH being regulated to effect this. Chlorine is removed from the anode compartment and some is taken off, in commercial operations, for use or sale as chlorine. Some is fed to the buffer compartment and an additional proportion is employed to help to control the pH so as to convert sodium hypochlorite to sodium chlorate externally of the cell. Hydrogen gas is removed from the cathode compartment and sodium hydroxide, when it reaches a satisfactory high concentration, is also taken off from that compartment. It is found to be essentially free of chloride ions and contains only about 1 g./l. of sodium chloride.

During the operation of the cell the pH in the buffer compartment is maintained in the range of 8 to 11, and usually is held at about 10, to promote formation of hypochlorite, the control of the pH being regulated by adjustment of the chlorine feed to the buffer compartment and to some extent, by feeding water and/or recirculating chloride-chlorate solution thereto. The pH in the anode compartment is held at about 4 and acidification control is maintained by additions of small proportions of hydrochloric acid. The pH in the cathode compartment is 14.

Externally of the cell the sodium hypochlorite solution, the effluent from the buffer compartment, is fed to the reaction-retention vessel, together with sodium chloride contained in the buffer solution, where the hypochlorite is converted to chlorate and some sodium chloride is also produced. A portion of the product from the reactor-retention vessel is sent to a sodium chlorate crystallizer and thence to a separator to remove solid sodium chlorate after initial removal of solid sodium chloride. The mother liquor remaining after chlorate removal is recycled back to the resaturator, together with the remaining portion of effluent from the reactor-retention vessel and withdrawn anolyte. The sodium chloride concentration of this liquid is increased in the resaturator to from 100 to 250 g./l. (the sodium chloride concentration in the withdrawn anolyte is about 70 to 99% of that of the feed). In the other streams fed to the resaturator the choride concentration is from 50 to 99% of that in the feed to the anode compartment. From the resaturator the salt solution, containing chlorate, is fed to both to the anode compartment and the buffer compartment, with a much greater proportion, about 5 to 100 times as much, going to the anode compartment and being recirculated therefrom. The only other feed utilized during the continuous operation of the process described is that of water to the catholyte. Proportions of the various feeds are given in the following table, together with other cell characteristics and results, for various runs.

TABLE 1

| | EXAMPLE | | | | | | | | | |
|---|---|---|---|---|---|---|---|---|---|---|
| | 1-1 | 1-2 | 1-3 | 1-4 | 1-5 | 1-6 | 1-7 | 1-8 | 1-9 | 1-10 |
| Average Anolyte NaCl Conc. (g./l.) | 188 | 206 | 179 | 156 | 174 | 189 | 103 | 125 | 118.1 | 120.5 |
| Av. Anolyte NaClO$_3$ Conc. (g./l.) | 226 | 181 | 198 | 208 | 206 | 272 | 430 | 357 | 403.6 | 410.8 |
| Av. Buffer Compartment NaOH Conc. (g./l.) | 25 | 44 | 35 | 30 | 29 | 16 | 11 | 24 | 36.2 | 48.3 |
| Av. Catholyte NaOH Conc. (g./l.) | 302 | 236 | 240 | 250 | 280 | 217 | 223 | 237 | 339.8 | 325.7 |
| Av. NaOH Accounted For or NaOH Efficiency, (%) | 96.6 | 92.4 | 91.4 | 98.3 | 89.5 | 86.8 | 99.5 | 90.9 | 98.4 | 99.6 |
| Av. Anode Current Efficiency (%, from gas analysis) | 96.7 | 98.0 | 97.5 | 97.7 | 96.5 | 98.3 | 92.1 | 92.2 | 94.1 | — |
| Av. Electric Current Flow (amperes) | 106 | 120 | 113 | 116 | 113 | 103 | 94 | 101 | — | — |
| Av. Current Density (a.s.i.) | 1.76 | 2.00 | 1.88 | 1.93 | 1.88 | 1.72 | 1.56 | 1.68 | 1.20 | 0.74 |
| Av. Potential Drop (volts) | 5.34 | 5.50 | 5.47 | 5.63 | 5.70 | 4.68 | 4.77 | 4.89 | 5.2 | 4.8 |
| Av. Temperature (°C.) | 87 | 92 | 92 | 92 | 92 | 90 | 92 | 91 | 70 | 59 |
| Av. Anolyte Recirculation Rate (l./hr.) | 120 | 120 | 120 | 120 | 120 | 120 | 120 | 120 | 48.6 | 56.4 |
| Av. Buffer Compartment Feed Rate (l./hr.) | 3.6 | 2.8 | 3.2 | 3.2 | 3.2 | 5.4 | 60.0 | 4.0 | 1.2 | 1.2 |
| Av. Buffer Effluent Rate (l./hr.) | 3.6 | 2.8 | 3.2 | 3.2 | 3.2 | 5.4 | 60.0 | 4.0 | 1.1 | 1.1 |
| Av. Catholyte Feed Rate (ml./hr.). | 500 | 400 | 390 | 280 | 280 | 470 | 370 | 430 | — | — |
| Av. Catholyte Effluent Rate (ml./hr.) | 590 | 490 | 470 | 370 | 368 | 560 | 450 | 440 | 9,100 | 4,920 |

The temperatures given are the same in all compartments of the cell.

EXAMPLE 2

In a modification of the preceding process the rate of chlorine feed to the buffer compartment is regulated so that the pH of the buffer solution is maintained at about 6.5, at which pH hypochlorite is converted to chlorate in the buffer compartment. The reactor-retention vessel is still utilized, to help convert any uncoverted hypochlorite to chlorate but the feed of chlorine to it is discontinued or cut to a small proportion of that formerly employed, such as 5 to 20% thereof. The buffer compartment sodium hydroxide concentration is diminished to 0 in all cases, with some free chlorine being present therein, instead. Otherwise, operations, conditions and results are essentially the same as those given in the preceding table.

EXAMPLE 3

The procedure of Example 1 is followed and essentially the same results are obtained, utilizing RAI Research Corporation membranes identified as 18ST12S and 16ST13S, respectively, instead of the hydrolyzed copolymer of tetrafluoroethylene and sulfonated perfluorovinyl ether. The former of the RAI products is a sulfostyrenated FEP in which the FEP is 18% styrenated and has ⅔ of the phenyl groups thereof monosulfonated, and the latter is 16% styrenated and has 13/16 of the phenyl groups monosulfonated. The membranes stand up well under the described operating conditions in the catholyte area but although the cell can be satisfactorily and usefully operated, short anolyte area life and increasing voltage drops make the membrane inferior to a cell with the membrane of Example 1 (but superior to available cation-active permselective membrane. After comparative uses the RAI membranes are significantly better in appearance and operating characteristics, e.g., physical appearance, uniformity, voltage drop, than other cation-active permselective membrane materials available (except the hydrolyzed copolymers of perfluorinated hydrocarbons and fluorosulfonated perfluorovinyl ethers). Similarly, when the RAI Research Corporation membranes 18ST12S and 16ST13S are substituted for the hydrolyzed copolymer membrane of Example 2 and no other changes are made in the process conditions, they function in the same manner, being superior to other cation-active permselective membranes but not having as long a useful life as the described hydrolyzed copolymers of perfluorinated hydrocabrons and fluorosulfonated perfluorovinyl ethers.

When in the preceding examples the temperatures, voltage drops, current densities, flow rates, membrane thicknesses and concentrations are varied within the ranges given, usually by ±20%, preferably ±10%, good production of hypochlorite and chlorate results. This is also the case when the cell is lined with unplasticized polyvinyl chloride over concrete, the cathode is changed to platinum on copper and the anode is of titanium oxide on titanium or tantalum. However, best results are obtained with the anode-cathode system previously exemplified.

The invention has been described with respect to working examples and illustrative embodiments but is not to be limited to these because it is evident that one of ordinary skill in the art will be able to utilize substitutes and equivalents without departing from the spirit of the invention or the scope of the claims.

What is claimed is:

1. In a process for electrolyzing an aqueous alkali metal chloride solution in an electrolytic cell having at least three compartments therein, an anode, a cathode, at least one permselective membrane of a hydrolyzed copolymer of a perfluorinated hydrocarbon and a fluosulfonated perfluorovinyl ether, or a sulfostyrenated perfluorinated ethylene propylene polymer, the cathode-sidewall of the buffer compartment between the anode and cathode and the anode-sidewall of said compartment being defined by such permselective membrane or a porous diaphragm, such walls, with walls thereabout defining an anode and cathode compartment, the improvement which comprises introducing an aqueous solution containing chloride and chlorate into the anode compartment of such cell, introducing water into the buffer and cathode compartments, passing electric current between the anode and cathode of said cell, forming hydroxide ions in both said buffer compartment and said cathode compartments and chlorine in said anode compartment, reacting gaseous chlorine with the contents of said buffer compartment and/or the solutions removed therefrom, the conditions of such reaction being controlled to produce hypochlorite or chlorate and chloride, converting the hypochlorite, when produced, to chlorate and chloride, feeding at least a portion of the chlorate and chloride thus produced to the anode compartment for electrolysis of chloride therein to chlorine, with a resulting increase in the proportion of chlorate to chloride in the anolyte, and recovering chlorine, chlorate and substantially chloride free hydroxide as the electrolysis products.

2. A method according to claim 1 wherein the permselective membranes define the buffer compartment walls common with other compartments and are of a hydrolyzed copolymer of tetrafluoroethylene and a sulfonated perfluorovinyl ether of the formula $FSO_2CF_2CF_2OCF(CF_3)CF_2OCF=CF_2$, which copolymer has an equivalent weight of about 900 to 1,600, gaseous chlorine is reacted with solution removed from the buffer compartment, the pH of the aqueous buffer compartment solution is maintained in the range of about 8 to 11 and the pH of the anode compartment solution is maintained in the range of about 1 to 6, with the concentrations of chloride and chlorate in the anode compartment and the buffer compartment being about the same.

3. A method according to claim 2 wherein the aqueous solution electrolyzed is a water solution of sodium chloride and sodium chlorate, the hydroxide, chlorate and chloride produced are sodium hydroxide, sodium chlorate and sodium chloride, respectively, the membrane walls are of a thickness of about 0.02 to 0.5 mm. and a portion of the anolyte is recirculated.

4. A method according to claim 3 wherein the membranes are mounted on a network of material selected from the group consisting of polytetrafluoroethylene, asbestos, perfluorinated ethylene propylene polymer, polypropylene, titanium, tantalum, niobium and noble metals, which has an area percentage of openings therein from about 8 to 80%, the temperatures of the anolyte, catholyte and buffer compartment contents are from 20° to 105°C., the pH of the reaction medium in which buffer compartment takeoff solution is converted to chlorate by treatment with chlorine gas is from 6 to 7.5, sodium chloride and sodium chlorate are separated from at least a portion of the buffer compartment medium after the reaction with chlorine and the remaining liquor, after said separation, is fed to the anode compartment.

5. A method according to claim 4 wherein the membranes are from 0.1 to 0.3 mm. thick, the network is a screen or cloth of polytetrafluoroethylene filaments having a thickness of 0.01 to 0.3 mm. which is less than or equal to the thickness of the membrane mounted thereon and the area percentage of openings in the screen or cloth is from 10 to 70%, water is added to the catholyte, liquid sodium hydroxide solution is removed therefrom, solid sodium chloride and sodium chlorate are obtained by crystallization and separation operations, at least part of the chlorine gas produced in the anode compartment is reacted with contents removed from the buffer compartment to produce chlorate and chloride and at least a part of the solution resulting from such reaction, together with the solution remaining after removal of solid sodium chloride and solid sodium chlorate therefrom and a portion of the anolyte are mixed together and fed to the anode compartment.

6. A method according to claim 5 wherein the surface of the cathode is of a material selected from the group consisting of platinum, iridium, ruthenium, rhodium, graphite, iron and steel and the surface of the anode is of a material selected from the group consisting of noble metals, noble metal alloys, noble metal oxides, mixtures of noble metal oxides with valve metal oxides and mixtures thereof, on a valve metal, the aqueous sodium chloride solution being electrolyzed is at a concentration of from 200 to 320 grams of NaCl per liter, the pH's of the anolyte and buffer compartment solution are about 1 to 5, the temperature of the electrolyte in anode, buffer and cathode compartments is about 50° to 105°C., the voltage is from about 2.3 to 5 volts, the current density is from about 0.5 to 4 amperes per square inch of electrode surface, a composition of the same constitution as the feed to the anode compartment is fed to the buffer compartment and the mixture of recirculated anolyte, sodium chloride and sodium chlorate in solution, from reaction of the buffer compartment solution with chlorine, and a mother liquor remaining after removal of solid sodium chloride and solid sodium chlorate from such solution are blended together and saturated with sodium chloride before being fed to the anode compartment and the buffer compartment.

7. A method according to claim 6 wherein the equivalent weight of the membrane copolymer is from about 1,100 to 1,400, the cathode is of steel and the anode is of ruthenium oxide on titanium, the aqueous sodium chloride solution being electrolyzed is at a concentration of 250 to 300 grams per liter, the pH of the anolyte is from 2 to 4 the temperature of the electrolyte is from about 65° to 95°C. in anode, buffer and cathode compartments, the three solutions of claim 6 that are blended together are passed through a salt resaturator wherein solid sodium chloride is dissolved therein to saturate the combined solution with sodium chloride and the solution is fed to the anolyte and buffer compartments, with the proportion being fed to the anode compartment such that the acid content thereof prevents the sodium hydroxide therein from causing salting out of sodium chlorate in the cell.

8. A method for electrolytically manufacturing a chlorate which comprises electrolyzing an aqueous solution containing chloride and chlorate ions in an electrolytic cell having at least three compartments therein, an anode, a cathode, at least one cation-active permselective membrane defining a cathode-side wall of a buffer compartment between the anode and cathode, an anode-side wall of said buffer compartment being defined by a cation-active permselective membrane or porous diaphragm, and such walls, with walls thereabouts, defining anode and cathode compartments, reacting gaseous chlorine with the contents of the buffer compartment and/or solution removed from it, regulating the rate of feed thereof and reaction conditions to produce hypochlorite or chlorate and chloride from hydroxide therein, converting the hypochlorite, when produced, to chlorate and chloride, feeding at least a portion of the chlorate and chloride produced thereby to the anode compartment and electrolyzing the chloride therein to chlorine, to increase the proportion of chlorate to chloride in the anolyte.

9. A continuous method according to claim 8 wherein the electrolytic cell includes three compartments, anode, buffer and cathode compartments, the walls separating such compartments are of cation-active permselective membrane, and sodium chloride and sodium chlorate are charged to the anolyte compartment and sodium chlorate, chlorine, chlorine-free aqueous sodium hydroxide solution and hydrogen are produced, the chlorate being produced from buffer compartment effluent external to the reactor.

* * * * *

UNITED STATES PATENT AND TRADEMARK OFFICE
CERTIFICATE OF CORRECTION

PATENT NO. : 3,878,072
DATED : April 15, 1975
INVENTOR(S) : Edward H. Cook, Jr. et al It is certified that error appears in the above-identified patent and that said Letters Patent are hereby corrected as shown below:

Column 2, line 6, "Case 3199" should read ---Serial Number 411,620, now US Patent 3,925,174, issued December 9, 1975---.

Signed and Sealed this

Tenth Day of August 1976

[SEAL]

Attest:

RUTH C. MASON
Attesting Officer

C. MARSHALL DANN
Commissioner of Patents and Trademarks